United States Patent [19]

Rausch

[11] Patent Number: 4,799,977

[45] Date of Patent: Jan. 24, 1989

[54] GRADED MULTIPHASE OXYCARBURIZED AND OXYCARBONITRIDED MATERIAL SYSTEMS

[75] Inventor: John J. Rausch, Lake Bluff, Ill.

[73] Assignee: Fansteel Inc., North Chicago, Ill.

[21] Appl. No.: 98,081

[22] Filed: Sep. 21, 1987

[51] Int. Cl.$^4$ .................... C21D 1/56; C21D 1/74
[52] U.S. Cl. ......................... 148/317; 148/20.3; 148/133; 148/316; 148/422; 428/610
[58] Field of Search .............. 148/20.3, 316, 317, 148/133, 422; 428/610, 932, 938; 420/424–427

[56] References Cited

U.S. PATENT DOCUMENTS

| | | | |
|---|---|---|---|
| 3,713,907 | 1/1973 | Van Thyne | 148/317 |
| 3,783,038 | 1/1974 | Van Thyne | 148/317 |
| 4,150,195 | 4/1979 | Tobioka | 428/623 |
| 4,357,382 | 11/1982 | Lambert | 428/698 |
| 4,399,168 | 8/1983 | Kullander | 148/316 |
| 4,490,191 | 12/1984 | Hale | 428/932 |
| 4,707,384 | 11/1987 | Schachner | 428/408 |

Primary Examiner—L. Dewayne Rutledge
Assistant Examiner—David W. Schumaker
Attorney, Agent, or Firm—Barnes, Kisselle, Raisch, Choate, Whittemore & Hulbert

[57] ABSTRACT

A graded material system comprising: a refractory metal alloy base having a major metal selected from the group consisting of Group V-B metals (columbium, tantalum and vanadium), and having at least one alloy metal selected from the group consisting of Group IV-B metals (titanium, zirconium and hafnium), Group VI-B metals (molybdenum, tungsten and chromium) and mixtures thereof. The base has a surface containing non-metallic pick-ups in concentration of at least 1 mg/cm$^2$ at said surface and decreasing inwardly from said surface. The non-metallic pick-ups are selected from the group consisting essentially of: oxygen and carbon; oxygen, carbon and nitrogen; oxygen, carbon and boron; and oxygen, carbon, nitrogen and boron.

16 Claims, 3 Drawing Sheets

GRADED MULTIPHASE OXYCARBURIZED AND OXYCARBONITRIDED MATERIAL SYSTEMS

The present invention is directed particularly to oxycarburized and oxycarbonitrided materials, particularly refractory metal alloys, which are characterized by a graded microstructure, and by exhibiting excellent abrasion and corrosion resistance in combination with a relatively fine grain size. Such materials are further characterized as being multiphase; i.e., they contain at least two phases, one or more of which are rich in carbon, oxygen or nitrogen and exhibit ceramic-like characteristics, and the other of which is principally metallic and exhibits metallic characteristics. Such materials are continuously graded from the surface inwardly in terms of microstructure, hardness, and either oxygen and carbon or oxygen, carbon and nitrogen concentrations. The ceramic-like phases are of highest concentration at the surface and diminish on moving inwardly. The alloys required to obtain such grading and desired properties encompass a broad range of binary, ternary or more complex refractory metal alloys. The metallic core, as well as the metallic matrix surrounded by the ceramic-like phases, imparts desirable characteristics to the composite materials, such as good thermal conductivity, strength and resistance to thermal stress. The use of refractory metal alloys as herein described results in an outstanding combination of abrasion and corrosion resistance and grain size, especially as compared to carburized ferrous metals and to state-of-the-art nitrided, carburized and carbonitrided refractory metal alloys.

The alloys which are oxycarburized or oxycarbonitrided in accordance with the invention can include a broad range of refractory metal alloys of the Group V-B metals (tantalum, columbium and vanadium) of the Periodic Table of Elements, wherein the Group V-B elements are the major elements in the alloy composition. The alloys can contain either selected additions of Group IV-B reactive metals (titanium, zirconium and hafnium), or Group VI-B refractory metals (molybdenum, tungsten and chromium), or most preferably both Group IV-B and VI-B metals. Other elements, such as yttrium, rhenium and others, that may or may not enter into reaction with oxygen, carbon and nitrogen, may be present as minor additions or unintended residual impurities in the alloy. It has been discovered that, when the above-named alloy system, which include many available commercially-produced state-of-the-art refractory metal alloys, are oxycarburized or oxycarbonitrided, there results a material having outstanding properties and related microstructures set out below.

U.S. Pat. Nos. 3,549,427 and 3,549,429, the disclosures of which are incorporated herein by reference, disclose a number of additional refractory metal alloy compositions, shown as compositional alloy ranges within the boundaries of a polygon on the specific ternary diagram, that pass criteria established for satisfactory nitrided material as described in those patents. The oxycarburizing and oxycarbonitriding treatments of the present invention can be employed in conjunction with such alloy compositions to achieve graded multiphase materials having outstanding combinations of hardness, corrosion resistance and relatively fine grain size. Reference is also made to U.S. Pat. No. 3,713,907.

In the present specification and claims, the terms "phase" and "multiphase" are employed as they are commonly used in metallurgical practice. "Phase" means a physically homogeneous and distinct portion of a materials system, and "multiphase" refers to two or more co-existing phases. The term "graded" is likewise employed in its usual sense as described above and in the referenced patents.

Carburizing, nitriding and carbonitriding of certain metals or alloys have heretofore been proposed. In certain nitrided alloys, up to 25 per cent of the nitrogen pick-up may be replaced by oxygen or boron or mixtures of these. Further, certain of the unreacted (base metal or substrate) alloys which are employed in the present invention are known in the art. However, the compositions of the prior art do not exhibit the graded multiphase composition or microstructure of the present invention with the excellent combination of hardness or abrasion resistance, corrosion resistance and relatively fine grain size as set forth below.

Oxygen, in particular, is an interstitial element in the Group IV-B metals that is normally avoided because of its reactivity with refractory metal alloys. It is known to produce voluminous, porous or even liquid oxides along with severe contamination and embrittlement in these materials. The effects of oxygen on various properties of tantalum and columbium (niobium) alloys are documented in "Tantalum and Niobium", by G. L. Miller, Academic Press, 1939; and "Columbium and Tantalum", by F. T. Sisco and E. Epremian, John Wiley and Sons, 1963. Efforts to avoid or reduce oxygen contamination of these metals include chemical processing, electron beam melting and welding, consumable electrode arc melting, use of high vacuum ($10^{-5}$ torr or better) in heat treatments, chemical cleaning by acid pickling or etching, and use of protective coatings to avoid oxidation at elevated temperatures.

By contrast, in accordance with the present invention, it has been found that employment of judicious amounts of oxygen, in combination with carbon or carbon and nitrogen, provides graded-microstructure products with unique and outstanding combinations of hardness and depth of hardening, corrosion resistance, and relatively fine grain size in the reaction zone and the underlying substrate. The present invention thus improves on the prior art represented by the referenced patents not only in terms of material properties, but also permits use of a greater number of alloying metals than heretofore recognized in the art.

In the preferred embodiments of the present invention, certain refractory metal alloy systems, generally described previously, are oxycarburized or oxycarbonitrided. Some specific commercially available refractory metal alloys oxycarburized or oxycarbonitrided in demonstrating the present invention include:

| Commercial Alloy Designation | Nominal Composition (Numbers are Wt. % Alloying Elements) |
| --- | --- |
| Tribocor 532 | Cb—30Ti—20W |
| Fansteel "85" Metal | Cb—28Ta—10.5W—0.9Zr |
| Cb-752 | Cb—10W—2.5Zr |
| C-103 | Cb—10Hf—1Ti |
| Ta-10W | Ta—10W |

The alloys were prepared by conventional electron beam melting or consumable electrode arc melting, or a combination of these, to produce ingots. A small addition of yttrium or rare earth metals is sometimes included in the melt to combine with any oxygen present for purposes of deoxidation of the metal. Mill products were produced from the ingots by conventional commercial techniques used for the particular alloys.

Alloy specimens were oxycarburized in an atmosphere of carbon monoxide, or carbon monoxide and argon with carbon monoxide contents ranging from 1 to 99% by volume. Carbon dioxide was substituted for a portion or all of the carbon monoxide in some runs. Water vapor was injected into the atmosphere in some runs, and served as a partial source for the oxygen in these cases. In addition, controlled additions of hydrocarbon gas, such as methane ($CH_4$), can be made to the oxycarburizing gas atmosphere to provide enrichment of carbon in the reaction depth. Thus, the oxycarburizing treatment has wide flexibility with respect to the amounts of oxygen and carbon that can be introduced in the reaction depth of the substrate. Consequently, the oxycarburizing process atmosphere composition, temperature, time and other process parameters can be selected to produce a carbon content higher than the oxygen content in the reaction zone, with these elements controlled to specific desired concentrations in order to achieve the optimum characteristics in the final composite; or, conversely, if desired, the oxygen content can be higher than the carbon content.

Alloy specimens were also oxycarbonitrided in an atmosphere of carbon monoxide and nitrogen, with atmosphere composition ranging from 1 to 99% carbon monoxide, balance nitrogen by volume. Again, additions of either carbon dioxide or water vapor were used to replace a portion of the carbon monoxide in some runs. Oxycarbonitriding can also be performed sequentially by first oxycarburizing the material, as described in the preceding paragraph, followed by nitriding the oxycarburized material in a nitrogen atmosphere; or conversely, by first nitriding, then oxycarburizing. Onynitriding the material in an atmosphere of nitrogen plus water vapor, oxygen or air, followed by carburizing or oxycarburizing is another optional method for oxycarbonitriding; or the converse of this technique. As described above, for the oxycarburizing treatment, a hydrocarbon gas can be added to the oxycarbonitriding atmosphere to achieve carbon enrichment. Thus, the oxycarbonitriding process also has wide flexibility, and desired ratios and concentrations of the introduced elements oxygen, carbon and nitrogen can be achieved. If desired, any of these three elements can have the maximum, intermediate or lowest concentration among them, with each present in the desired content in the reaction depth of the oxycarbonitrided part.

The oxycarburizing or oxycarbonitriding treatments of the alloy specimens were conducted in commercial induction furnaces with graphite susceptors. The furnace, with specimens loaded, was evacuated, filled with the desired gas composition, brought to the desired temperature (typically 3000° to 3400° F.) and held for the desired time (typically 4 to 24 hrs.) to produce the desired oxygen plus carbon, or oxygen plus carbon plus nitrogen pick-ups, then cooled under atmosphere.

The treated specimens were evaluated by a number of experimental techniques. Weight gain was determined on sheet or plate specimens. Microstructures were examined and microhardness traverses for depth of hardening were performed on polished or polished and etched cross sections. Chemical analyses for oxygen, carbon and nitrogen contents were made on treated wire specimens of the alloys. Other treated specimens were used for: wetting tests in molten aluminum; corrosion test in hydrochloric acid plus hydrofluoric acid, and in boiling 70% sulfuric acid; and oxidation tests in an air atmosphere at several selected elevated temperatures.

In order to produce useful oxycarburized and oxycarbonitrided composite materials of the present alloy systems, it has been found that the oxygen plus carbon, or the oxygen plus carbon plus nitrogen pick-up must be at least 1 $mg/cm^2$ of surface area, although higher amounts are preferred. In addition, the microhardness at the surface should be at least 1000 diamond pyramid number (DPN), and the reaction depth to which such hardness is developed should be at least 0.0004 in. (0.0108 mm). The hardness of the surface layers can be further substantially increased and the coefficient of friction markedly decreased by subsequent boronizing of the oxycarburized or oxycarbonitrided composite materials of the present alloy systems. The boron-enriched reaction depth from the surface should be at least about 1 micrometer (0.001 mm), and more preferably about 3 micrometers (0.003 mm). The hardness at the surface of such boronized material is typically about 3800 DPN.

EXAMPLE 1

Figure 1:
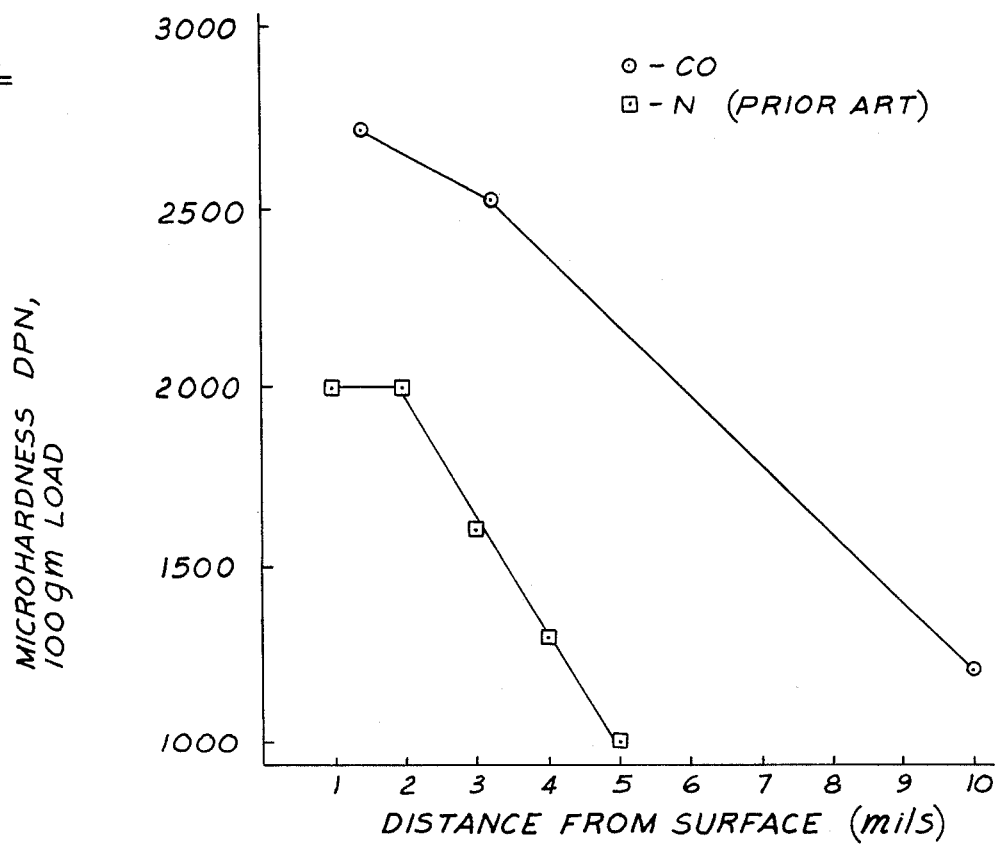
FIG. 1 is a graphic comparison of microhardness gradients for Cb-30%Ti-20%W alloy reacted in CO versus nitrogen.

A specimen of Cb-30%Ti-20%W alloy, having dimensions of 0.6×1.0×0.187 in., was heated in an induction furnace, having a graphite susceptor, in controlled atmosphere of Ar-10 v/o (volumetric percent) CO at a pressure of 2 psig. The temperature of the specimen was raised steadily from room temperature to 3500° F. over a 30 min. period, and the specimen was held at that temperature for 4 hours, after which furnace power was turned off and the system cooled to room temperature over a period of several hours. The specimen had a uniform black color, and weight change measurements showed a gain of 50.1 mg/$cm^2$ of surface area. Microhardness measurements were made on a polished cross-section using a diamond pyramid indentor at a load of 100 grams. A hardness gradient as a function of distance from the surface was obtained as shown by the upper curve in FIG. 1. The lower curve in FIG. 1 shows the hardness traverse for the same alloy reacted with nitrogen alone to the same level of absorption. When reacted with CO rather than $N_2$, it will be noted that there is a marked increase in the level of hardness and the depth to which high hardness is attained.

Figure 2:
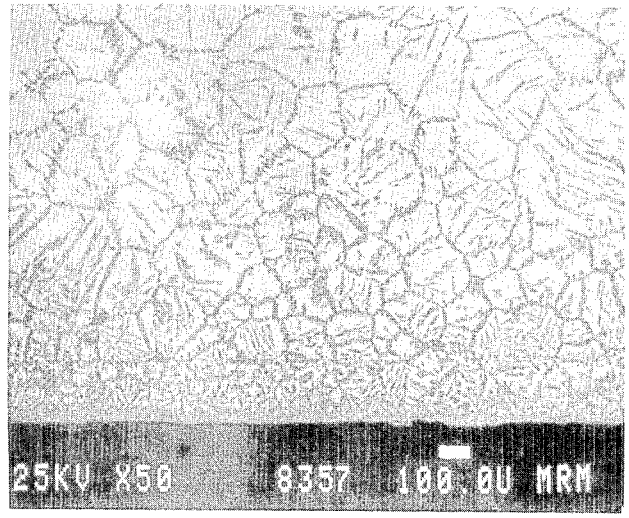
FIG. 2 is a photomicrograph of Cb-30%Ti-20%W alloy reacted in Ar-10%CO at 3500° F. for 4 hours.
Figure 3:
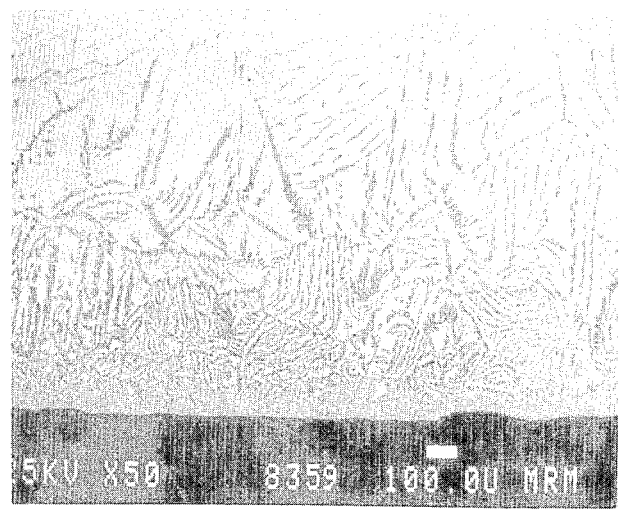
FIG. 3 is a photomicrograph of Cb-30%Ti-20%W alloy reacted in nitrogen at 3420° F. for 4 hours.

The microstructures of the material systems were also examined and a striking difference was noted in the grain size and gradiation of the substrates resulting from the two different treatments. The specimen reacted in CO (FIG. 2) exhibits a relatively fine grain size when compared to the same alloy nitrided (FIG. 3). The carburized fine-grained material would be expected to show greater isotropic properties and better fracture toughness.

EXAMPLE 2

Figure 4:
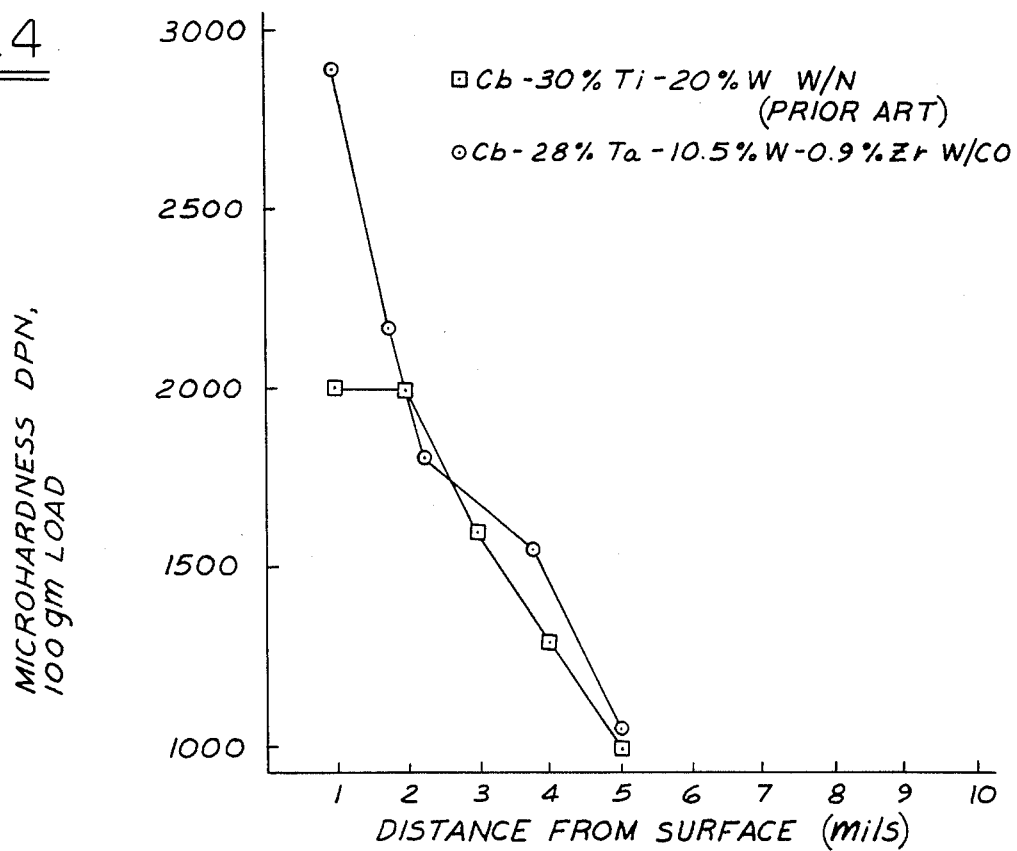
FIG. 4 is a graphic comparison of microhardness gradients for Cb-28%Ta-10.5%W-0.9%Zr alloy reacted in CO versus Cb-30%Ti-20%W alloy reacted in nitrogen.

An alloy of Cb-28%Ta-10.5%W-0.9%Zr was reacted in a 100% CO atmosphere at 3450° F. for 4 hours. A microhardness traverse made on a polished cross-section showed the desirable hardness gradient depicted in FIG. 4. This material has higher surface hardness, but a similar grading of properties, when compared to a Cb-30%Ti-20%W alloy reacted with nitrogen alone to a level of 50 mg/cm$^2$ of absorption. It should be noted that this level of hardening and desirable grading occurred in the Cb-Ta-W-Zr alloy reacted with CO alone to an absorption level of only 18.1 mg/cm$^2$ of surface area. Furthermore, when this alloy is reacted with nitrogen alone, it develops a hard surface layer with an abrupt hardness discontinuity beneath, which is an undesirable grading characteristic.

EXAMPLE 3

Figure 5:
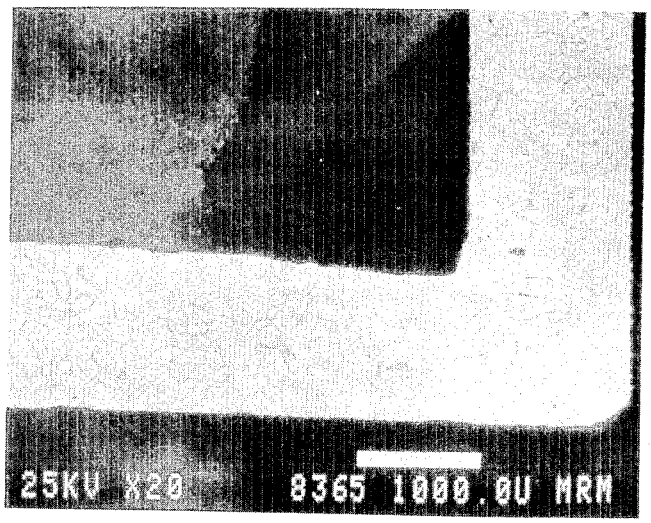
FIG. 5 is a photograph showing the result of melting aluminum in a crucible made by reacting Cb-30%Ti-20%W alloy in CO.
Figure 6:
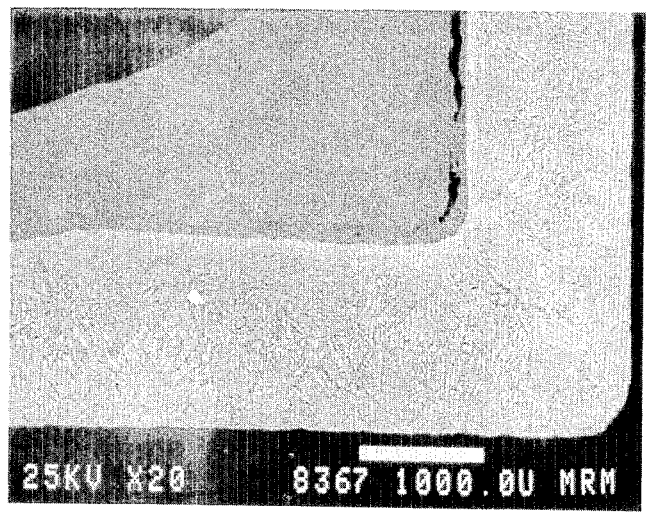
FIG. 6 is a photograph showing the result of melting aluminum in a crucible made by reacting Cb-30%Ti-20%W alloy in nitrogen.

Small crucibles of Cb-30%Ti-20%W alloy were made by machining wrought bar stock. Each crucible was made by machining a 1½ in. O.D.×½ in. length piece of bar stock to produce a cavity ⅜ in. I.D.×approximately 7/16 depth. One crucible was reacted in nitrogen alone at 3420° F. for 4 hours and another in Ar-10 v/o CO at 3500° F. for 4 hours. Both treatments achieved an interstitial element abosrption pick-up level of about 50 mg/cm$^2$. A 3-gram piece of commercially pure aluminum was placed in each crucible, and both were heated under vacuum to 1450° F. and held for 1 hour, after which they were cooled to room temperature. The crucibles were mounted in epoxy, ground and polished in cross-section, and are shown in FIGS. 5 and 6. The aluminum in the CO-reacted crucible (FIG. 5) formed a non-wetting droplet and showed very little, if any, evidence of reaction. The aluminum in the nitrided crucible (FIG. 6) wet very readily and showed extensive reaction with the nitrided surface. Aluminide intermetallic compound layers were formed on the wall of the crucible, and nitride particles were observed in the aluminum.

EXAMPLE 4

A specimen of Cb-30%Ti-20%W having dimensions of 0.6×2.0×0.187 in. was heated in an atmosphere of N$_2$, CO and H$_2$O at 3400° F. for 45 min. A 0.098 in. dia×1 in. long wire in the same run was analyzed and showed the following change in interstitial element content as a result of the exposure:

| Element | Concentration (w/o) | |
| --- | --- | --- |
| | Before | After |
| N | 0.01 | 2.9 |
| C | 0.01 | 1.5 |
| O | 0.07 | 0.56 |

Figure 7:
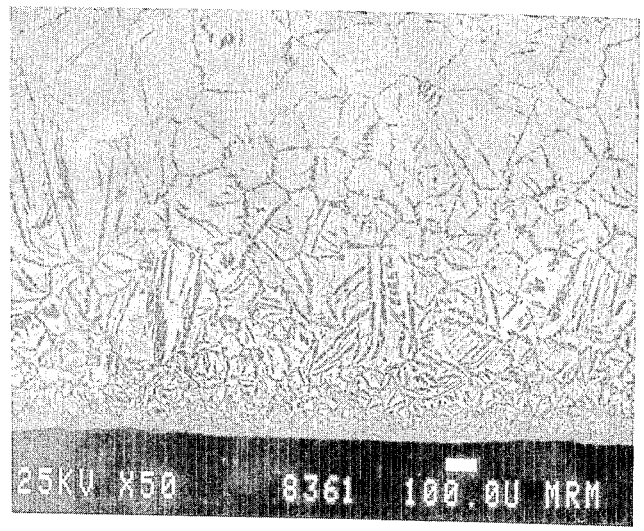
FIG. 7 is a photomicrograph showing microstructure of Cb-30%Ti-20%W alloy reacted initially with nitrogen, carbon and oxygen, and subsequently nitrided to a total interstitial weight gain of 52mg/$cm^2$ of surface area.

The specimen was subsequently heated in essentially pure nitrogen at 3400° F. for 3 hours, which resulted in a total weight gain of interstitial elements of 52 mg/cm$^2$ for the combined treatments. The cross-sectional photomicrograph in FIG. 7 shows that a relatively fine grain deeply graded microstructure has resulted, as compared for example to that shown in FIG. 3 for material that was only nitrided.

EXAMPLE 5

Specimens of Cb-30%Ti-20%W alloy given an oxycarburizing treatment as described in Example 1, or as given as oxycarbonitriding treatment as described in Example 4, were boronized. This was accomplished by packing the specimens in boron carbide powder, then heating the pack for 4 hours at 2300° F. This treatment resulted in a smooth, boron-rich surface layer in both types of pretreated specimens about 3 micrometers thick and exhibiting a microhardness of about 3800 DPN as measured directly on the surface using a diamond pyramid indentor at a load of 100 grams.

EXAMPLE 6

A specimen of the commercial alloy C103 having a composition Cb-10Hf-1Ti was heated in an atmosphere of 50% N$_2$ - 50% CO at 3400° F. for 4 hours. Metallographic examination of the reacted specimen showed it to have a relatively fine grained, graded microstructure. Microhardness measurements confirmed the gradual continuous change in hardness as a function of distance from the surface. Additionally, this material was found to have much higher hardness and a far greater depth of hardening than the prior art material reacted in nitrogen alone. Comparative hardness gradients are as follows:

| Distance from Surface (Mils) | Microhardness DPN, 100 gm. load | |
| --- | --- | --- |
| | Cb—30Ti—20W 3400° F.-4 hrs., N$_2$ | Cb—10Hf—1Ti 3400° F.-4 hrs., 50% N$_2$-50% CO |
| 2 | 2000 | 3600 |
| 3 | 1600 | 3300 |
| 4 | 1250 | 2960 |
| 5 | 1000 | 2600 |
| 10 | 800 | 1950 |
| 15 | 700 | 1600 |
| 20 | 600 | 1100 |
| 25 | 580 | 800 |

The excellent abrasion and corrosion resistant properties of the oxycarburized and of the oxycarbonitrided graded materials can be effectively employed, along with their other useful properties and characteristics, in a wide variety of products and applications. Among these are: crucibles, ladles, dies and other hardware for melting and handling molten metals; pump parts; mechanical seals, including rotary seals; bearings and bushings; valve plugs and other valve components; knives; blades; scrapers; slitters; shears; dies for extrusion, drawing, and other forming operations; forming tools; needles; electrodes, including EDM (electrical discharge machining) electrodes; spinnerets; armor; gun barrel lines; impellers; fan blades; grinders (thread, wire, and other); grinding media; pulverizing hammers and rolls; capstans; agitator blades; cylinder liners; tire studs; engine components; brake plates; screens; feed screws; sprockets; chains; specialized electrical contacts; protection tubes; single point cutting tools; multiple point cutting tools, including rotary burrs, files, routers, and saws; drills; taps; punches; and a variety of parts used in corossion-abrasion environments in the paper-making, chemical and petrochemical industries, and oil and gas exploration and drilling, as examples.

It will be understood that various modifications and variations may be effected without departing from the spirit or scope of the novel concepts of the invention.

The invention claimed is:

1. A multiphase graded material system comprising: a refractory metal alloy base having a major metal selected from the group consisting of Group V-B metals (columbium, tantalum and vanadium), and having at least one alloy metal selected from the group consisting of Group IV-B metals (titanium, zirconium and hafnium), Group VI-B metals (molybdenum, tungsten and chromium) and mixtures thereof; said base having a surface containing non-metallic pick-ups in phases coexisting with said refractory metal alloy in concentration of at least 1 mg/cm$^2$ at said surface and decreasing inwardly from said surface, said non-metallic pick-ups being selected from the group consisting essentially of: oxygen and carbon; oxygen, carbon and nitrogen; oxygen, carbon and boron; and oxygen, carbon, nitrogen and boron.

2. The graded material system according to claim 1 wherein said surface concentration is in excess of 18 mg/cm$^2$.

3. The graded material system according to claim 2 wherein said surface concentration is on the order of 50 mg/cm$^2$.

4. The graded material system according to claim 1 having a surface hardness of at least 1000 DPN and a graded reaction depth of at least 0.0004 in.

5. The graded material system according to claim 4 having a surface hardness of at least 2500 DPN.

6. The graded material system according to claim 1 wherein said surface contains boron in concentration sufficient to impart a surface hardness of about 3800 DPN and a boron reaction depth of at least 0.001 mm.

7. The graded material system according to claim 6 wherein said boron reaction depth is about 0.003 mm.

8. A surface graded multiphase oxycarburized material having a pick-up phase of oxygen and carbon of at least 1 milligram per square centimeter of surface area and having excellent abrasion and corrosion resistance characteristics in a base consisting essentially of a refractory metal alloy phase wherein a Group V-B metal selected from columbium, tantalum and vanadium of the Periodic Table of Elements is the major metal, and an alloy metal selected from the group consisting of Group IV-B metals (titanium, zirconium and hafnium), Group VI-B metals (molybdenum, tungsten and chromium), and mixtures of at least one Group IV-B metal and at least one Group VI-B metal.

9. An oxycarburized graded material according to claim 8 wherein the surface microhardness is at least 1000 DPN and the reaction depth to which such hardness is developed is at least 0.0004 inch.

10. An oxycarburized graded material according to claim 8 wherein the carbon content exceeds the oxygen content in the reaction depth.

11. An oxycarburized graded material according to claim 8 wherein the oxygen content exceeds the carbon content in the reaction depth.

12. An oxycarburized graded material according to claim 8 and further having a boron-rich surface layer of at least about 1 micrometers depth and having a microhardness of about 3800 DPN in the surface layer.

13. A surface graded multiphase oxycarbonitrided material having a pick-up phase of oxygen, carbon and nitrogen of at least 1 milligram per square centimeter of surface area and having excellent abrasion and corrosion resistance characteristics in a base consisting essentially of a refractory metal alloy phase wherein a Group V-B metal selected from columbium, tantalum and vanadium of the Periodic Table of Elements is the major metal, and an alloy metal selected from the group consisting of Group IV-B metals (titanium, zirconium and hafnium), Group VI-B metals (molybdenum, tungsten and chromium), and mixtures of at least one Group IV-B metal and at least one Group VI-B metal.

14. An oxycarbonitrided graded material according to claim 13 wherein the surface microhardness is at least 1000 DPN and the reaction depth to which such hardness is developed is at least 0.0004 inch.

15. An oxycarbonitrided graded material according to claim 13 wherein the content of any element selected from oxygen, carbon and nitrogen may have either the highest or an intermediate concentration among these selected elements in the reaction depth.

16. An oxycarbonitrided graded material according to claim 13 and further having a boron-rich surface layer of at least about 1 micrometer depth and having a microhardness of about 3800 DPN in the surface layer.

* * * * *